(12) United States Patent
Tiuca et al.

(10) Patent No.: US 9,959,294 B2
(45) Date of Patent: May 1, 2018

(54) ORGANIZING DIGITAL IMAGES FROM MULTIPLE IMAGE REPOSITORIES

(71) Applicants: Canon Canada Inc., Mississauga (CA); Canon U.S.A., Inc., Melville, NY (US)

(72) Inventors: Teodor Mihai Tiuca, Waterloo (CA); Imaad Umar, Waterloo (CA); Khurram Ahmad, Milton (CA); Matt Scobel, Kitchener (CA); Mimi Vuong, Vaughan (CA); Aaron Lobo, Newmarket (CA)

(73) Assignees: Canon Canada Inc., Mississauga (CA); Canon U.S.A., Inc., Melville, NY (US)

( * ) Notice: Subject to any disclaimer, the term of this patent is extended or adjusted under 35 U.S.C. 154(b) by 239 days.

(21) Appl. No.: 15/135,395

(22) Filed: Apr. 21, 2016

(65) Prior Publication Data

US 2016/0328397 A1 Nov. 10, 2016

Related U.S. Application Data

(60) Provisional application No. 62/159,108, filed on May 8, 2015.

(51) Int. Cl.
*G06F 17/30* (2006.01)
*G06T 1/00* (2006.01)

(52) U.S. Cl.
CPC .... *G06F 17/3028* (2013.01); *G06F 17/30268* (2013.01); *G06T 1/0007* (2013.01)

(58) Field of Classification Search
None
See application file for complete search history.

(56) References Cited

U.S. PATENT DOCUMENTS

| 7,444,354 | B2 * | 10/2008 | Kaburagi | G06F 17/30265 |
| 7,464,110 | B2 | 12/2008 | Pyhalammi | |
| 8,433,721 | B2 | 4/2013 | Jeon | |
| 2004/0201735 | A1 * | 10/2004 | Baron | H04N 1/2112 |
| | | | | 348/231.2 |
| 2004/0236768 | A1 * | 11/2004 | Saito | H04N 1/00132 |
| 2008/0065645 | A1 * | 3/2008 | Eichhorn | G06F 17/3028 |
| 2009/0157638 | A1 * | 6/2009 | Flynn | G06F 17/30265 |
| 2014/0250091 | A1 * | 9/2014 | Wu | G06F 17/3002 |
| | | | | 707/694 |

* cited by examiner

*Primary Examiner* — Asher D Kells
(74) *Attorney, Agent, or Firm* — Canon U.S.A., Inc. IP Division (57) ABSTRACT

Devices, systems, and methods obtain lists of image identifiers from multiple image repositories; organize the image identifiers in the lists of image identifiers into an image queue, thereby generating an image queue that includes image identifiers from multiple image repositories; and obtain a first image that is identified by a first image identifier in the queue, wherein the first image is obtained from a first image repository of the multiple image repositories. The devices, systems, and methods also add the first image to a display, obtain a first input from a user interface, remove the first image from the display, and change a storage location of the first image based on the first input. And the devices, systems, and methods obtain a second image that is identified by a second image identifier in the queue and add the second image from the image queue to the display.

10 Claims, 9 Drawing Sheets

ORGANIZING DIGITAL IMAGES FROM MULTIPLE IMAGE REPOSITORIES

CROSS-REFERENCE TO RELATED APPLICATIONS

This application claims the benefit of U.S. Provisional Application No. 62/159,108, which was filed on May 8, 2015.

BACKGROUND

Technical Field

This application generally relates to managing and organizing digital images.

Background

With the increase in digital photography over the past several years, users have been presented with the tasks of managing and organizing all of the digital images they have taken. This includes not only determining where to store their digital images, but how to store them such that the user can easily sort or search the digital images. Currently, the most prevalent way to sort digital images has been manually, through the use of specialized digital-image-library-management software applications, and auto sorted libraries.

Users traditionally sort their digital images by importing them into a file-management application running on their computers, tablets, etc., and then manually sorting them according to the user's personal preferences. For example, this can entail creating various folders associated with different events (e.g., wedding, summer trip) and moving event-related digital images into their respective folders. This process can also include deleting unwanted images (e.g., blurry images).

In order to make the storing and sorting process easier for users, specialized digital-image-library-management software applications were developed. These applications automate some of the steps or actions associated with the manual process referenced above. More specifically, these applications can automatically generate folders and can group or organize digital images based on factors, such as image capture time, image capture location, etc. However, these applications do not filter out unusable or unwanted images, and do not provide users with flexibility when organizing digital images.

More recently, digital-image-management-software applications have been introduced that generate a "moments" album. This process has typically consisted of storing photos on a remote server (e.g., "the cloud"), and once a pre-determined number of images are stored, a mini album containing images based on a determination carried out by the software application is generated. One drawback to this approach is that digital images are not actually sorted or organized, but rather only specific digital images are highlighted.

While all of the above-described methods provide users with the ability, at some level, to manage and organize all of a user's digital images, these methods are still either very manual intensive or do not provide the user with much flexibility.

SUMMARY

At least one aspect of the present disclosure generally relates to providing users with the capability to organize digital images with greater flexibility and less manual steps.

An aspect of the present disclosure generally relates to a method for organizing digital images where a connection is made with a digital-image-storage location service, and the digital images are sorted or organized directly on the digital-image-storage location service. Images to be sorted or organized are selected, and a mode to queue the selected digital images for sorting or organizing is selected from a variety of modes. The selected digital images are displayed and, based on an input operation, the digital images are kept or discarded.

In some embodiments, a method comprises obtaining lists of image identifiers from multiple image repositories; organizing the image identifiers in the lists of image identifiers into an image queue, thereby generating an image queue that includes image identifiers from multiple image repositories; and obtaining a first image that is identified by a first image identifier in the queue, wherein the first image is obtained from a first image repository of the multiple image repositories. The method further comprises adding the first image to a display, obtaining a first input from a user interface, removing the first image from the display, and changing a storage location of the first image based on the first input. And the method also comprises obtaining a second image that is identified by a second image identifier in the queue, wherein the second image is obtained from a second image repository of the multiple image repositories, and adding the second image from the image queue to the display.

In some embodiments, a device comprises one or more computer-readable media and one or more processors that are coupled to the one or more computer-readable media. Also, the one or more processors are configured to cause the device to obtain respective lists of image identifiers from multiple image repositories; organize the images in the lists of image identifiers into an image queue, thereby generating an image queue that includes image identifiers from multiple image repositories, wherein the image queue defines a sequential order of the image identifiers, and wherein the sequential order of the image identifiers intermingles respective image identifiers from the multiple image repositories. Furthermore, the one or more processors are configured to cause the device to, in the sequential order defined by the image queue, obtain a next image identifier from the image queue, retrieve a next image that is identified by the next image identifier from a respective image repository, add the next image to a display, receive a user input from a user interface, remove the next image from the display in response to receiving the user input, and set an image identifier subsequent to the next image identifier in the sequential order as the next image.

DESCRIPTION

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
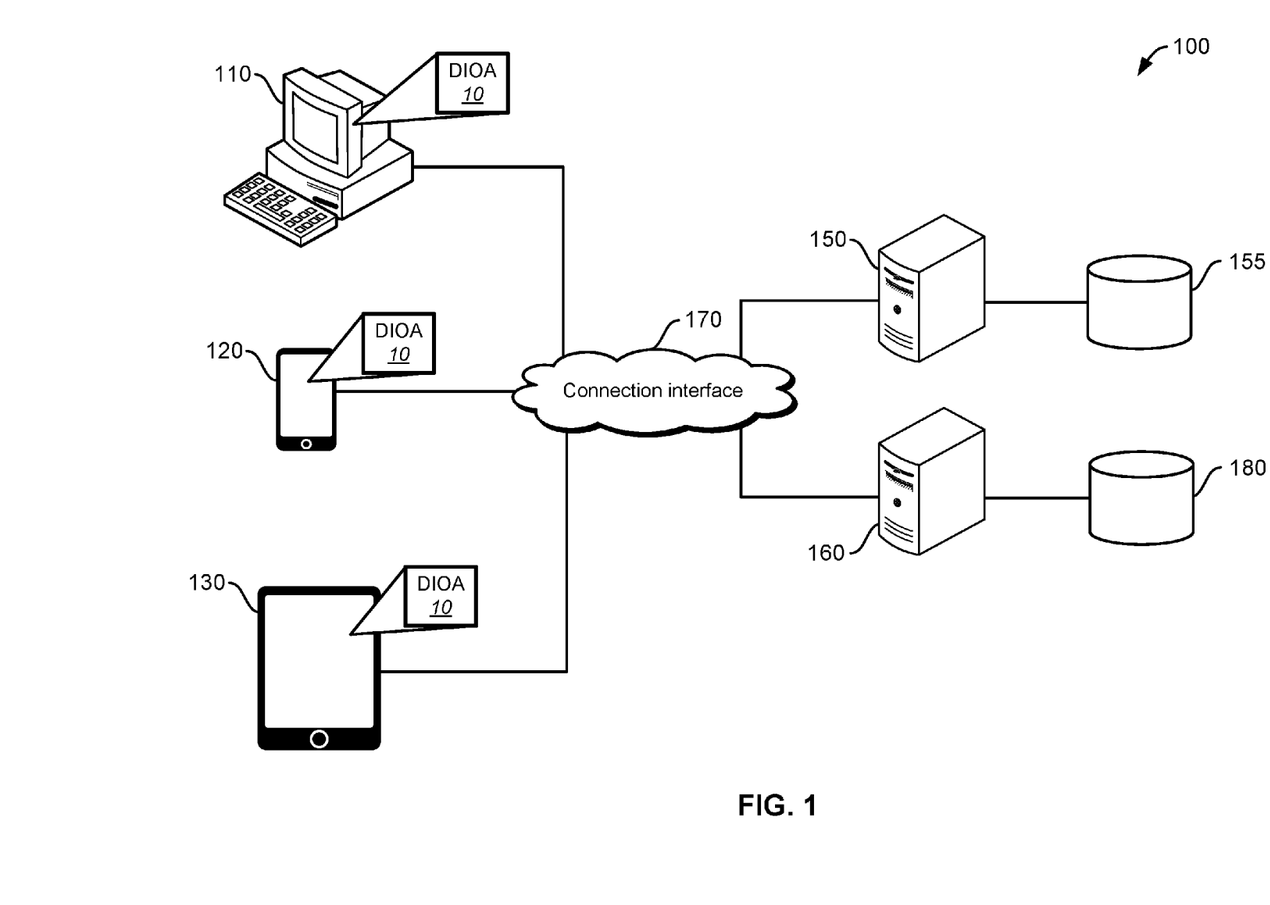
FIG. 1 illustrates an example embodiment of a system for organizing digital images.

FIG. 1 illustrates an example embodiment of a system 100 for organizing digital images. The system 100 includes, but is not limited to, a control server 150, a digital-image-storage server 160 (also referred to herein as "digital-image server 160"), and a user device (e.g., a computer 110, a mobile phone 120, a tablet 130).

The control server 150 stores user-related information, such as user account information (e.g., user name, login credentials). In addition, the control server 150 generates and stores queue information, described in more detail below, that is associated with a user's digital images. In the present embodiment, the information is stored in a database 155. However, some embodiments use other storage resources. The database 155 can be included as part of the control server 150 or can be located remotely from the control server 155.

The digital-image server 160 stores a user's digital images. In order to store and then later access digital images on the digital-image server 160, a user can generate an account on the digital-image server 160, along with login credentials that can be used to access the account. In this embodiment, a user's digital images and account information is stored in an image database 180. However, some embodiments use other storage resources. The image database 180 can be included as part of the digital-image server 160 or can be located remotely from the digital-image server 160.

The computer 110, the smartphone 120, and the tablet 130 are examples of user devices. A user can operate each of these devices via different types of user interfaces, including a touch display or an analog device (e.g., a keyboard, a mouse). While this embodiment illustrates three specific user devices, some embodiments include other user devices. For explanatory purposes, the following description may refer to the computer 110 as an example of a user device.

A digital-image-organization application (DIOA) 10 is stored on and executed by the user devices. The DIOA 10 communicates with the control server 150 and the digital-image server 160 via a connection interface 170 (e.g., a network).

The connection interface 170 can be any applicable communication interface, for example, a wireless interface, a mobile broadband interface, a Bluetooth interface, etc.

Figure 2:
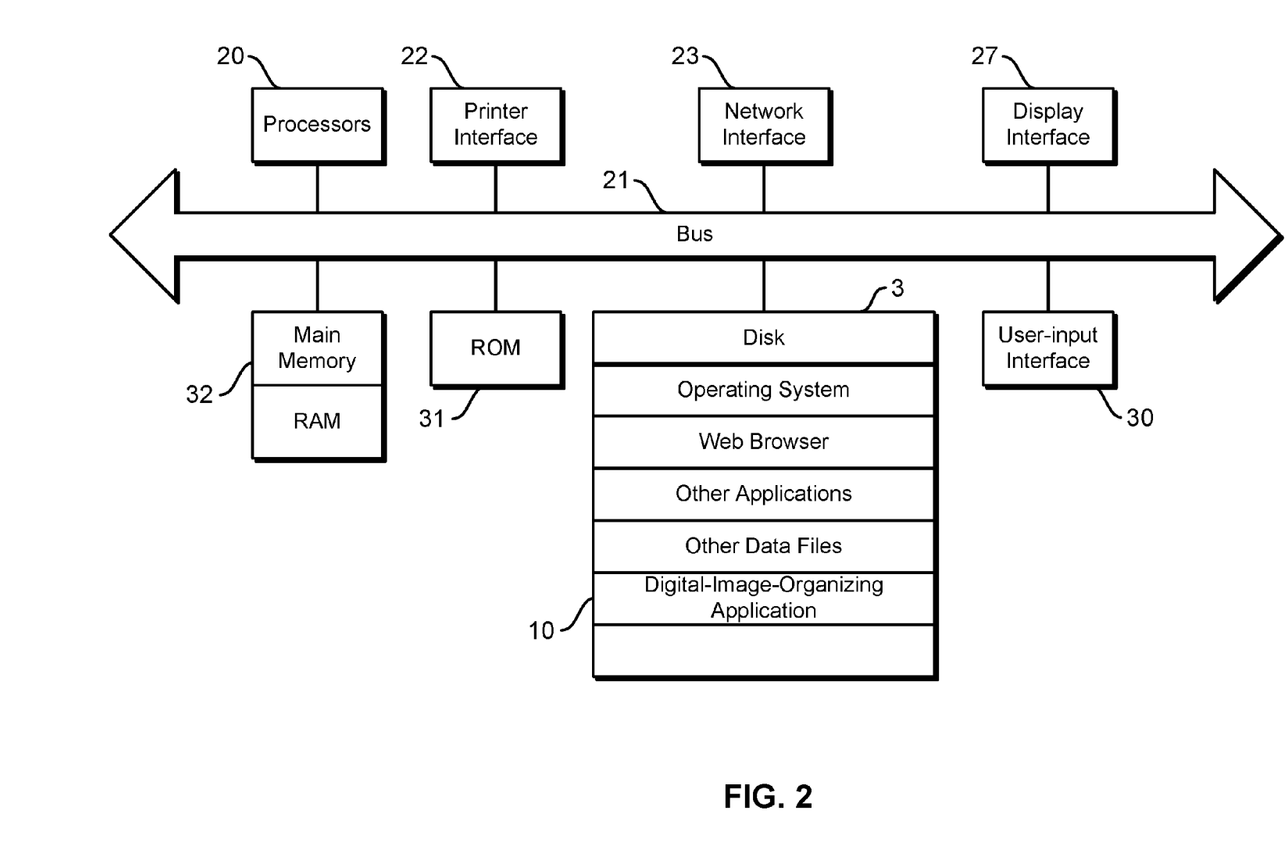
FIG. 2 illustrates an example embodiment of a device for organizing digital images.

FIG. 2 illustrates an example embodiment of a device (e.g., a computer 110, a phone 120, a tablet 130, a control server 150) for organizing digital images. The device includes one or more processors 20. The one or more processors 20 include one or more central processing units (CPUs), which include microprocessors (e.g., a single core microprocessor, a multi-core microprocessor) or other electronic circuitry. The one or more processors 20 are configured to read and perform computer-executable instructions, such as instructions that are stored in the read only memory (ROM) 31, the main memory 32, or the storage 3.

The device also includes I/O interfaces. I/O interfaces include communication interfaces to input and output devices, which may include a keyboard, a display, a mouse, a printing device, a touch screen, a light pen, an optical-storage device, a scanner, a microphone, a camera, a drive, a controller (e.g., a joystick, a control pad), and a network interface controller. This embodiment of the device includes a printer interface 22, which enables the device to communicate with a local or remote printer; a network interface 23, which enables the device to communicate with a network; a display interface 27, which enables the device to communicate with a display device; and a user-input interface 30, which enables the device to communicate with an input device (e.g., a touch screen, a keyboard, a mouse).

The ROM 31 stores invariant computer-executable instructions for basic system functions, such as basic I/O or start-up. The main memory 32, which includes random access memory (RAM), provides the processors 20 with memory that can be accessed quickly.

The device also includes the storage 3. The storage 3 includes one or more computer-readable storage media. A computer-readable storage medium, in contrast to a mere transitory, propagating signal per se, includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, RAM, SRAM, DRAM, ROM, EPROM, EEPROM). Also, as used herein, a transitory computer-readable medium refers to a mere transitory, propagating signal per se, and a non-transitory computer-readable medium refers to any computer-readable medium that is not merely a transitory, propagating signal per se. The storage 3 can store computer-executable data or computer-executable instructions.

The storage 3 includes an operating system, a web browser, other applications (e.g., word processing, spreadsheet, and graphics applications), and data files. The storage 3 further includes the DIOA 10. In the storage 3, the DIOA 10 includes logic, computer-readable data, or computer-executable instructions. Also, the DIOA 10 may be implemented in software (e.g., Assembly, C, C++, C#, Java, BASIC, Perl, Visual Basic), hardware (e.g., customized circuitry), or a combination of software and hardware. In FIG. 2, the DIOA 10 includes instructions that, when executed, or circuits that, when activated, cause the device to implement the operations that are specified by the DIOA 10 (e.g., the operations that are shown in FIGS. 3A-3E and 5).

Also, the hardware components of the device communicate by means of one or more buses 21 or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

FIGS. 3A-3D illustrate an example embodiment of an operational flow for organizing digital images. When a particular user device implements the operational flow, the user device interacts with a control server 150 and a digital-image server 160 to enable efficient sorting and organizing of digital images that are stored on the digital-image server 160. Also, although this operational flow and the other operational flows that are described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of this operational flow and the other operational flows that are described herein may omit blocks, add blocks, change the order of the blocks, combine blocks, or divide blocks into more blocks.

Figure 3A:
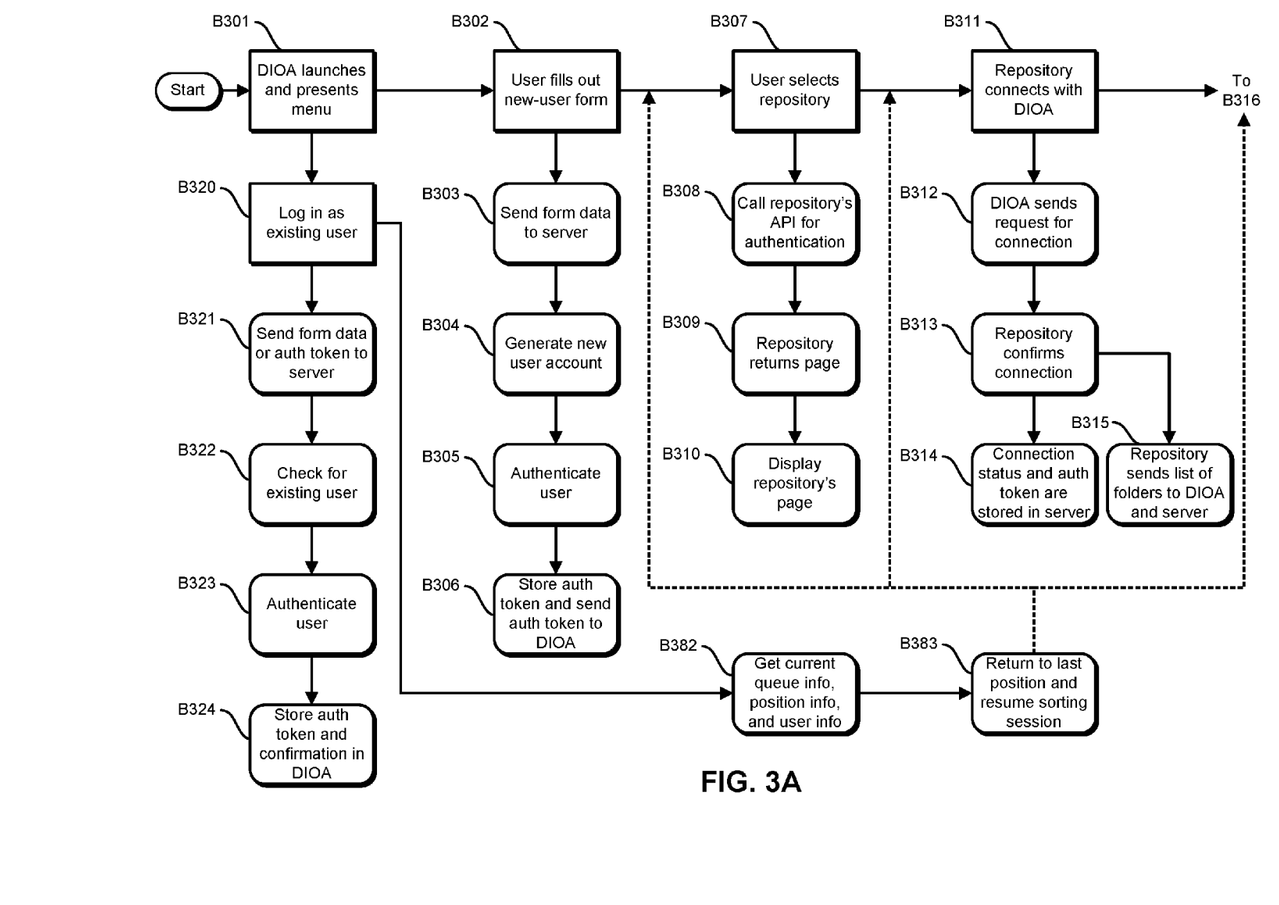
FIGS. 3A-3D illustrate an example embodiment of an operational flow for organizing digital images.

The flow starts in B301, where a user issues a command to initiate execution of the DIOA 10 on a user device (e.g., a computer 110, a phone 120, a table 130), which launches the DIOA 10. When launched, the DIOA 10 presents a menu, for example as explained in the description of FIG. 3E. If this is the first launch of the DIOA 10, then the flow proceeds to B302. However, if this is not the first time that a user has ever launched the DIOA 10 on a device, then B301 includes B320-B324. Thus, in these situations, the flow proceeds to B320.

In B320, the user initiates the process for logging in to the DIOA 10 on a specific device. The login process will differ if the user previously launched the DIOA 10 on the specific device or if this is the first time the user has launched the DIOA 10 on the specific device. For descriptive purposes, this example uses a computer 110 as a device where the DIOA 10 was previously launched and uses a tablet 130 as a device where the DIOA 10 is being launched for the first time.

In B321, if the DIOA 10 is being launched on the computer 110, then the authentication token that is associated with the user, which was stored in B306, is sent to the control server 150. If the DIOA 10 is being launched on the tablet 130, then the user is prompted to enter the user information that was entered in B303 and stored in B304, and the entered user information is sent to the control server 150. The flow then proceeds to B322.

In B322, upon receipt of the authentication token or user information, the control server 150 verifies that the user is an existing user by comparing the received authentication token or user information with the user information or the authentication tokens that are stored in the database 155. If the received authentication token or user information matches an authentication token or user information stored in the database 155, then in B323, the control server 150 authenticates the user.

If the DIOA 10 was launched on the tablet 130, then in B323, as part of authenticating the user based on the received user information, the control server 150 retrieves the authentication token that is associated with the received user information from the database 155 and sends it to the tablet 130. Next, in B324, the DIOA 10 on the tablet 130 stores the received authentication token. If the DIOA 10 was launched on the computer 110, then B324 is not performed, in some embodiments.

In B302, the DIOA 10 presents the user with a form to complete that enables the user to generate an account on the control server 150. The form includes several fields for the user to enter identification information and other user-related information. Also, B302 includes B303-B306. Thus, once the user has provided the requested information (hereinafter referred to as "user information"), then the flow moves to B303, where the DIOA 10 sends the user information to the control server 150.

Next, in B304, the control server 150 generates a new user account based on the information sent in B303 and stores the user-account information and user information in the database 155. The flow moves to B305, where the control server 150 authenticates the user, which may include generating an authentication token that is associated with the particular user. Then, in B306, the control server 150 stores the authentication token in the database 155 in association with the previously-stored user-account information and the user information. A copy of the authentication token is also sent to the DIOA 10, which causes the authentication token to be stored on the user device.

The flow then proceeds to B307, where the user selects a repository that stores the user's digital images. The DIOA 10 interacts with the selected repository to display and allow sorting of the digital images on the repository. In some embodiments, the DIOA 10 provides the user with a list of repositories (e.g., Dropbox®, Google Docs®) from which to select the repository.

The list of repositories may be pre-populated with external repositories, and the list can be modified by the user. In B307, the user can select a repository where the user has already created an account and stored digital images. For example purposes, the digital-image server 160 will be referred to as the repository of the digital images. Also, B307 includes B308-B310.

Upon selection by the user of the digital-image server 160, in B308, the DIOA 10 sends a request to the digital-image server 160 for the digital-image server 160 to provide the login or authentication criteria (e.g., login page, authentication page) that is needed for the user to access the digital-image server 160 and the services provided by the digital-image server 160. This may include calling the API (application programming interface) of the digital-image server 160 for authentication.

In response, the digital-image server 160 returns its login page or authentication page in B309. For example, the API of the digital-image server 160 may return its login page or authentication page. Next, in B310, the DIOA 10 causes the user device to display the login page or the authentication page on a display device (which may be integrated with the user device).

Next, in B311, the DIOA 10 connects with the repository, which is the digital-image server 160 in this example. Connecting with the repository may include obtaining the user's login or authentication information that is associated with the user's account on the digital-image server 160. The information may be obtained via the login page or the authentication page that is displayed in B310. Also, B311 includes B312-B315. In B312, the DIOA 10 sends the login or authentication information and a request for connection to the digital-image server 160.

In B313, digital-image server 160 confirms the connection with the DIOA 10. Then the flow proceeds to B314 and B315. In B314, the connection status and the user's authentication tokens for the digital-image server 160 are sent to the DIOA 10, and the DIOA 10 then sends them to the control server 150. The control server 150 stores the connection status and the authentication tokens, in association with the previously-stored user information for the particular user, in the database 155.

Additionally, following the connection confirmation in B313, in B315 the digital-image server 160 sends a list of data folders that are associated with the user to the DIOA 10. The DIOA 10 sends the received list of data folders to the control server 150, which stores it in the database 155 in association with the user information of the user. In some embodiments, these folders and the contents of the folders are stored in the digital-image server 160 or an image database 180. However, other embodiments may store these folders and their contents in different repositories. These folders were previously generated on by digital-image server 160 in response to instructions from the user, and these folders contain digital images previously stored there by the user.

Figure 3B:
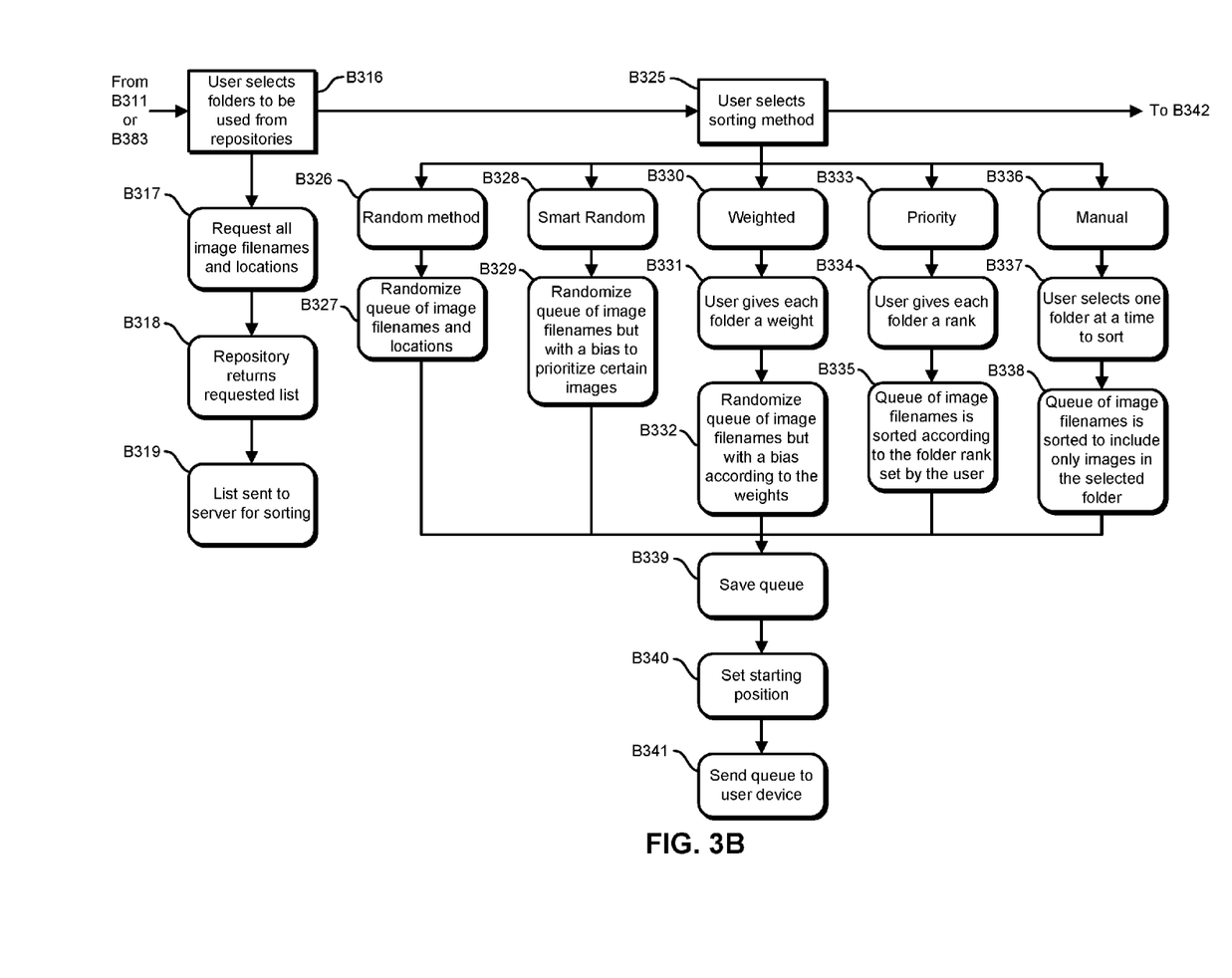

The flow then moves to B316 in FIG. 3B. In B316, using the DIOA 10, the user initiates the process of selecting which of the folders provided in B315 that the user wishes to access using the DIOA 10. Also, B316 includes B317-B319. In B317, the user communicates with the DIOA 10 to select the applicable folders from the list that was provided in B315. The DIOA 10, upon receipt of the user's selection, sends a request to the digital-image server 160 to provide a list with the filenames and the locations of the digital images that are stored in the selected folders. The list can be modified by the user.

In B318, the digital-image server 160 (or other repository) retrieves the requested information (e.g., filenames, locations) from storage (e.g., internal storage, the image database 180) and sends a list that includes the requested information to the DIOA 10. Then, in B319, the DIOA 10 sends the list to the control server 150, where the received information is stored in the database 155 in association with the user information. The list may include filenames and locations of digital images from different repositories. The flow then proceeds to B325.

In B325, the DIOA 10 provides the user with the option to select the method that will be used to sort the folders or the digital images that were provided in B319. This enables the user to determine which digital images will eventually be presented to the user and the order in which the digital images will be presented. When the DIOA 10 is initially launched, a default sorting selection method may be selected. During subsequent uses of the DIOA 10, the default sorting method can be modified. B325 also includes B326-B341.

If a random method B326 is selected, then the flow proceeds to B327. In B327, the control server 150 initiates a process to generate a queue in which the digital images are randomly presented.

If a smart-random method B328 is selected, then the flow moves to B329. In B329, the control server 150 initiates a process to generate a queue in which the digital images are randomly presented. However, the digital images that are located in folders that are less full than other folders are presented more often than digital images from other folders.

When a weighted method B330 is selected, then the flow moves to B331. In B331, the user assigns a weight to each folder by means of the DIOA 10. Then, in B332, the control server 150 initiates a process to generate a queue of digital-image filenames where the digital images are randomly ordered based on the weight set that was assigned in B331.

When a priority method B333 is selected, then, in B334, the user assigns a rank to each folder by means of the DIOA 10. Next, in B335, the control server 150 initiates a process to generate a queue of the digital-image filenames in which the digital images are ordered based on the folder rank that was assigned in B334.

Finally, when a manual method B326 is selected, then, in B337, the user manually selects a single folder by means of the DIOA 10. The flow then moves to B338, where the control server 150 initiates a process to generate a queue of digital-image filenames where only digital images located in the folder selected in B337 would be presented.

Following selection of any of the above-described sorting methods, in B339, the control server 150 saves (e.g., in the database 155) the queue of filenames that was created by means of the selected sorting method. A position (i.e., which digital image to start with when presenting the digital images) within the queue is set in B340. Then in B341, the control server 150 sends the queue to the DIOA 10.

Figure 3C:
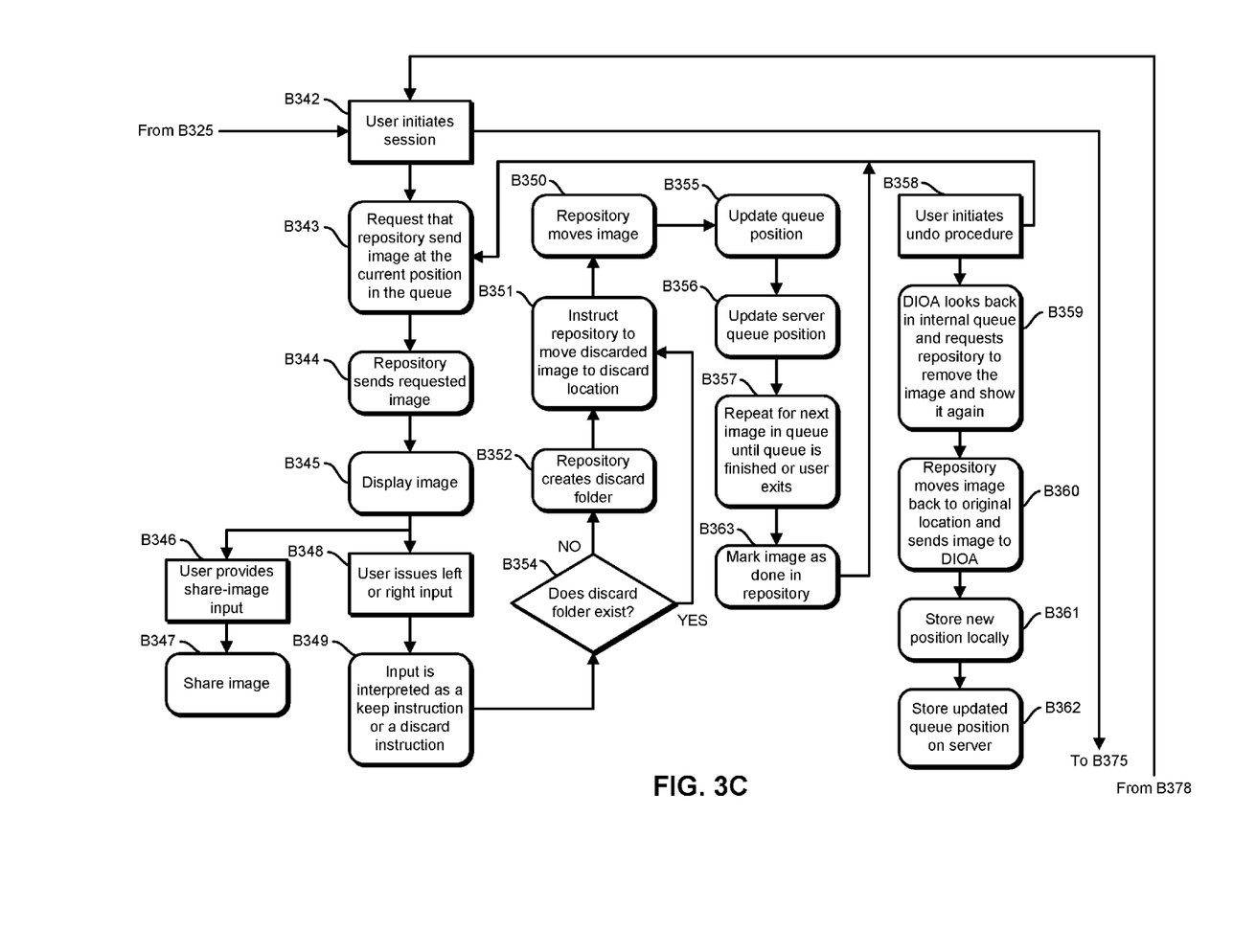

Following the generation of the queue in FIG. 3B, the flow moves to FIG. 3C. In FIG. 3C, the queue is used to view the digital images that are stored in an image database 180. In some embodiments, once a queue has been established, the digital images are presented to the user one-at-a-time. However, in some embodiments, the digital images are not presented to the user at a frequency of one-at-a-time. A local copy of the queue may be maintained by the DIOA 10 on the user device (e.g., the computer 110), and the user device may use the local copy of the queue to retrieve and display digital images to the user via a display device (e.g., a screen that is integrated with the user device).

In B342 of FIG. 3C, the user initiates a session to view the digital images based on the queue that was created in B339. B342 includes B343-B362. First, in B343, the DIOA 10 determines the digital image that is currently at the current (e.g., first, most recent) position in the queue and sends a request to the repository (e.g., the digital-image server 160) to send the digital image to the DIOA 10. Upon receipt of the request, in B344 the repository retrieves the digital image and sends the digital image to the DIOA 10. In some embodiments, the digital image is sent as a thumbnail. However, some embodiments send the unmodified digital image.

After receipt of the digital image, in B345 the digital image is displayed. Next, in B346 (which is optional in some embodiments) the user determines to share the received digital image and provides a share-image input. In B347, the sharing of the digital image is implemented using known digital-image-sharing or file-sharing methods. Also, in B348, the user can issue an input to the user device (e.g., the computer 110). The user input can include, but is not limited to, a swiping motion on a touch display or a signal from an analog device (e.g., a left-click from a mouse).

In B349, the user's input from B348 is interpreted by the DIOA 10 to determine whether to keep or discard the digital image. For example, if the user device includes a touch display, swiping left on the touch display could be interpreted as an instruction to discard the digital image, and swiping right on the touch display could be interpreted as an instruction to keep the digital image. The relationship between a particular input and an associated result may be different in other embodiments.

The DIOA 10 sends the user instruction that was obtained in B349 to the repository (e.g., digital-image server 160), and in B354, the repository determines whether a "discard folder" exists in the repository. If the repository determines that a "discard folder" does not exist, then in B352 the repository creates a "discard folder." After the creation of the "discard folder" in B352, or if it is determined in B354 that a "discard folder" exists, then the flow moves to B351.

In B351, if the user instruction in B349 was a discard instruction for the digital image, then the DIOA 10 instructs the repository to move the digital image to the "discard folder." In B350, if the instruction is a discard instruction, then the repository moves the digital image to the "discard folder." If, in B349, the user instruction was a keep instruction for the digital image, then the DIOA 10 takes no further action in B351 and B350, and the digital image remains in its original folder. The flow then moves to B355.

In B355, the DIOA 10 advances the position in the queue stored on the user device (e.g., the computer 110, the tablet 130) to the next position. Then in B356, the control server 150 is notified of the position update resulting from the position advancement. The control server 150 updates the queue position in its queue to reflect the advancement of the position in the queue based on the received position-update information. In B357, the DIOA 10, the repository, and the control server 150 repeat B343-B356 for the next digital image in the queue until all of the digital images have been handled or until the user exits the session. In B363, the repository marks the digital images such that they will not be included in any further sorting sessions. This prevents sorted images from being included in future sorting sessions, for example if the user selects a sorting method that requires the control server 150 to generate a new queue.

If the user wishes to undo the above-described operations, then in B358, the user initiates an undo procedure, which includes B359-B362. In B359, the DIOA 10 queries the local queue that is stored on the user device (e.g., the computer 110, the phone 120, the tablet 130) and sends a request to the digital-image server 160 to move a digital image from the "discard folder," if it was previously discarded, back to its original folder and to provide the digital image for display on the user device. Upon receipt of the request, in B360 the digital-image server 160 moves the digital image back to its original folder and sends the digital image to the DIOA 10 on the user device.

Upon receipt of the image, in B361 the DIOA 10 adds the digital image to the local queue, updates the queue position back to the position of the photo that was "undone," and stores the updated queue and position. In B362, the DIOA 10 sends the updated queue position information to the control server 150, where the control server 150 stores the queue position information in the database 155. Upon completion of the undo procedure, the flow returns to B343.

Figure 3D:
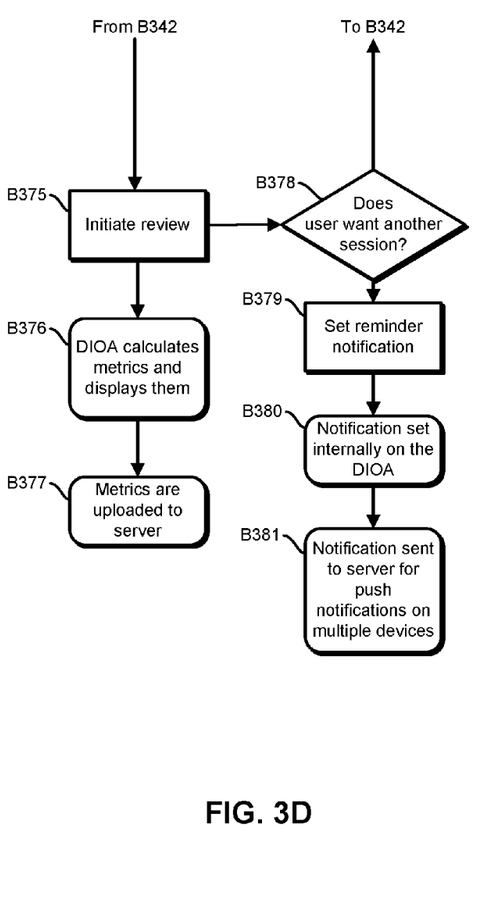

FIG. 3D illustrates the options that the DIOA 10 provides to a user after a sorting session has ended, either due to the user exiting the session or due to all the digital images in a queue having been reviewed. The DIOA 10 provides the user with the ability to review statistics that are associated with a recently completed session. Thus, after B342, the flow can proceed to B375, where review of the statistics is initiated. Next, in B376, the DIOA 10 calculates various session-related metrics and displays them on a display device. These metrics may include, for example, the amount of time used to sort digital images, the amount of time spent on a particular digital image, etc. In B377, the DIOA 10 uploads the session-related metrics to the control server 150, where they are stored in the database 155.

After B375, or immediately upon completion of a sorting session, the DIOA 10 also enables the user to initiate another sorting session. Thus, the flow moves to B378. In B378, the DIOA 10 determines whether the user wants to initiate another sorting session. For example, the user can initiate another sorting session via a menu that is presented to the user on a display device of a user device.

In B379, the user can instruct the DIOA 10 to set a reminder notification as to when the DIOA 10 will prompt the user to start another sorting session. For example, the notification can be based on a time since the last sort session was completed, or it can be based on a fixed time interval between sorting sessions. The DIOA 10 sets the notification reminder locally in B380. The notification reminder is sent to the control server 150 in B381, where it is stored in the database 155. The control server 150 can then push the notification reminder to various user devices that are running the DIOA 10 (e.g., the computer 110, the smartphone 120, the tablet 130).

Figure 3E:
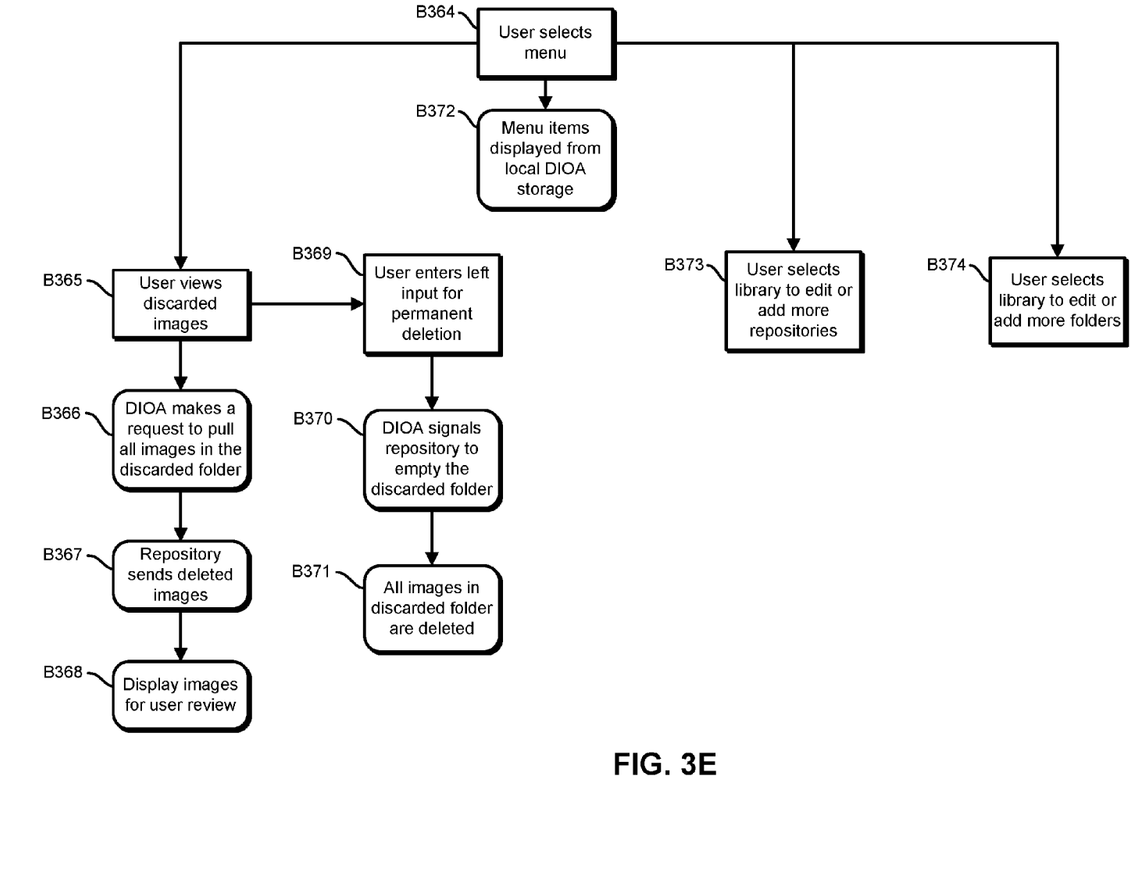
FIG. 3E illustrates an example embodiment of an operational flow for displaying a menu.

As noted above in B301, when launched, the DIOA 10 presents the user with a menu, from which various tasks can be selected. FIG. 3E illustrates an example embodiment of an operational flow for displaying a menu. In B364, the user initiates the process, which causes the DIOA 10 to display various menu options in B372 by means of a display device, and selects an option on the meu.

In B365, the user is provided with an option to request the viewing of discarded digital images. When the request is initiated, in B366 the DIOA 10 sends a request to the repository (e.g., the image server 160) to obtain all digital images that are located in the "discard folder" in the repository. Upon receipt of the request, in B367 the repository (e.g., the image server 160) retrieves the digital images or version of the digital images (e.g., thumbnails) from the "discard folder" and sends the retrieved images to the user device (e.g., the computer 110, the phone 120, the tablet 130). Then, in B368, the user device displays the received images on a display device (e.g., a display device integrated with or otherwise coupled to the user device).

If the user wishes to permanently delete all of the discarded digital images, then in B369, the user device receives a user input for permanent deletion. For example, if the user device includes a touch display, then the user may place a finger on the discarded image that the user wishes to permanently delete and swipe the finger to the left. While swiping left is described herein as an example of the user operation, other embodiments may use other user operations (e.g., an input received via an analog device).

Following receipt of the user operation, then in B370 the DIOA 10 sends a request to the repository (e.g., the image server 160) to empty the contents of the "discard folder." In B371, the repository (e.g., the digital-image server 160) proceeds to delete the digital images from the "discard folder" in the image database 180.

Also, in B373, the DIOA 10 causes the user device to present the user with a menu that enables the user to add additional repositories where the user has stored digital images or to delete previously-added repositories. To delete a repository, the user selects, via the menu, the repository that the user no longer wishes the DIOA 10 to interact with. The DIOA 10 then removes the selected repository from the list of repositories. For example, to add an additional repository, the user may presented with a list of repositories, and the user may select the new repository from the list.

In B374, the user is provided with the ability to add additional folders that the user wishes to access or the ability to delete previously-added folders. When adding a new folder, the DIOA 10 allows the user to add an existing folder that was not previously selected or add a folder that did not exist when the previous folder-selection process occurred. In order to add a folder that did not previously exist, the user would first have to access the repository (e.g., the digital-image server 160) and create a new folder using the same functionality that the user used to previously generate folders on the repository. Once the new folder is generated, then the user can request the repository to send the list of folders (e.g., similar to B315). This list may include any previously-existing folders that were not already selected. Next, the use could initiate the above-described folder selection process for selecting additional folders.

To delete a currently-selected folder, the user may, via a menu, select the folders that are to be deleted from the list. The DIOA 10 then sends a request to the control server 150 to remove the selected folders from the list that is stored in the database 155. The control server 150 then removes any digital images that are associated with the removed folders from the current queue and sends an updated queue to the DIOA 10.

Some embodiments can be performed using a single user device. However, some embodiments use multiple user devices. For example, a user may launch the DIOA 10 on a computer 110, which proceeds per the flows that are described above. At some point during a sorting session, which was initiated in B342, the user may terminate the sorting session mid-session. Later, the user wishes to resume the sorting session on a tablet 130 instead of the computer 110. As described above in B355 and B356, the control server 150 receives and stores updated queue information from the DIOA 10, which operates on the computer 110, as digital images in the queue are handled.

When the user launches the DIOA 10 on the tablet 130, the DIOA 10 authenticates the user and connects to the control server 150 (e.g., as described in B320-B323). Upon authentication and connection, in B382 of FIG. 3A, the control server 150 sends the updated queue information to the DIOA 10 on the tablet 130. Then, in B383, the DIOA 10 resumes the sorting session on the tablet 130 where the user left off on the computer 110. In addition to resuming a sorting session, the DIOA 10 can resume the process at any point where the user stopped the process or logged off the DIOA 10.

Figure 4:
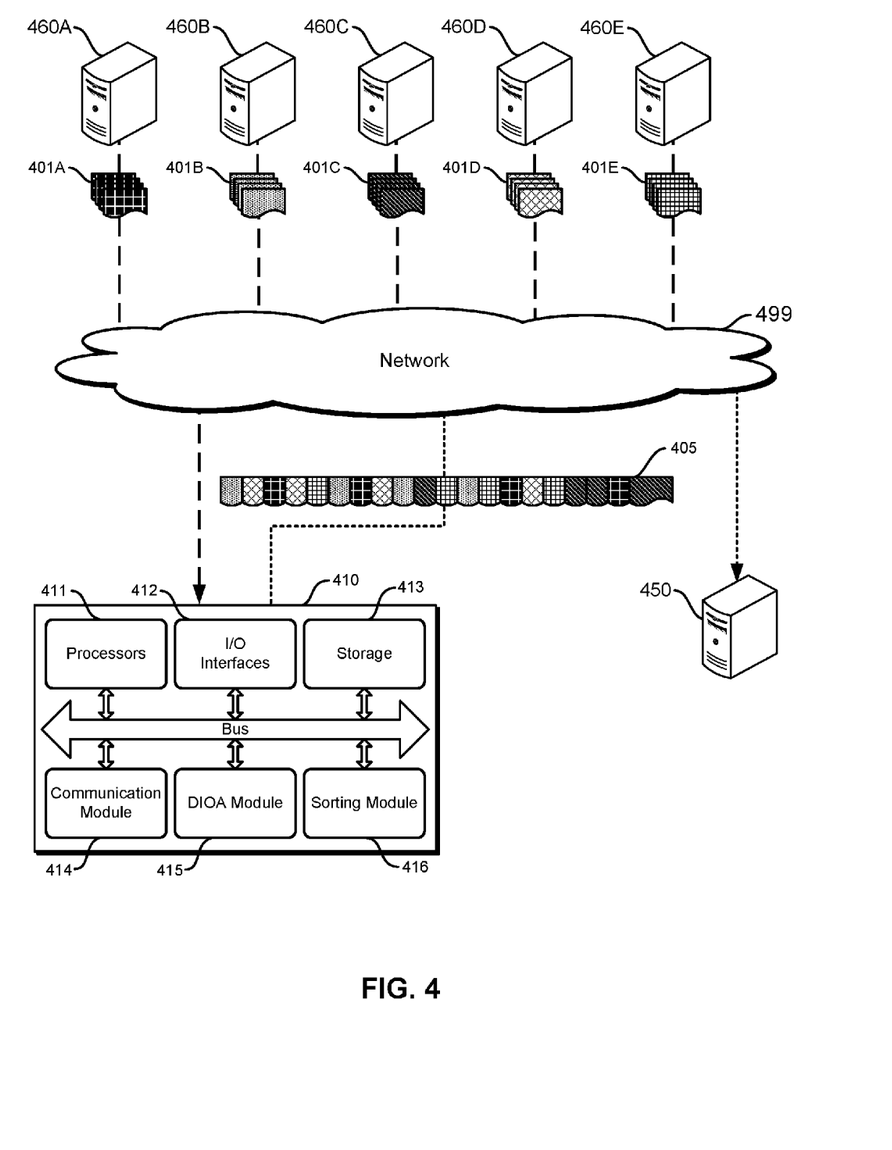
FIG. 4 illustrates an example embodiment of a system for organizing digital images.

FIG. 4 illustrates an example embodiment of a system for organizing digital images. The system includes a user device 410, a plurality of digital-image servers 460A-E, and a control server 450. In this embodiment, the devices in the system communicate by means of one or more networks 499, which may include a wired network, a wireless network, a LAN, a WAN, a MAN, and a PAN. Also, in some embodiments the devices communicate by means of other wired or wireless channels.

The user device 410 includes one or more processors 411, one or more I/O interfaces 412, and storage 413. Also, the hardware components of the user device 410 communicate by means of one or more buses or other electrical connections.

The I/O interfaces 903 include communication interfaces to input and output devices, which may include a keyboard, a display, a mouse, a printing device, a touch screen, a light pen, an optical-storage device, a scanner, a microphone, a camera, a drive, a controller (e.g., a joystick, a control pad), and a network interface controller.

The user device 410 also includes a communication module 414, a DIOA module 415, and a sorting module 416. A module includes logic, computer-readable data, or computer-executable instructions, and may be implemented in software (e.g., Assembly, C, C++, C#, Java, BASIC, Perl, Visual Basic), hardware (e.g., customized circuitry), or a combination of software and hardware. In some embodiments, the devices in the system include additional or fewer modules, the modules are combined into fewer modules, or the modules are divided into more modules. When the modules are implemented in software, the software can be stored in the storage 413.

The communication module 414 includes instructions that, when executed, or circuits that, when activated, cause the user device 410 to communicate with one or more other devices (e.g., the digital-image servers 460A-E, the control server 450) by means of the I/O interfaces 412.

The DIOA module 415 includes instructions that, when executed, or circuits that, when activated, cause the user device 410 to generate a user interface that includes a menu, authenticate a user to the control server 450 and one or more of the digital-image servers 460A-E, obtain images from the digital-image servers 460A-E, present an image queue 405 on a display device, receive user input instructions, change a respective storage location of a digital image in response to an input instruction, change a queue position, restart a previous session, generate session metrics, present the session metrics on a display device, set reminder notifications, or prompt the user about other sessions. For example, in some embodiments, the DIOA module 415 includes instructions that, when executed, or circuits that, when activated, cause the user device 410 to implement or initiate the operations in B301-B25, B340, B342-B349, B350-B352, B354-B563, B375-B381, and B364-B374.

The sorting module 416 includes instructions that, when executed, or circuits that, when activated, cause the user device 410 to sort the digital images 401A-E, which were received from the digital-image servers 460A-E, into an image queue 405. In some embodiments, the sorting module 416 includes instructions that, when executed, or circuits that, when activated, cause the user device 410 to implement or initiate the operations in B326-B339. Thus, the sorting module 416 can generate a single image queue 405 that includes digital images 401A-E that were received from multiple repositories (e.g., digital-image servers). Furthermore, in the queue, the respective digital images from the digital-image servers 460A-E can be intermingled. Thus, as the queue position advances through the queue 405 during a sorting session, the digital images from one digital-image server (e.g., a first digital-image server 460A) will be interspersed with the digital images from one or more of the other digital-image servers (e.g., digital-image servers 460B-E).

Additionally, in some embodiments, the sorting module 416 is combined with the DIOA module 415. Also, in some embodiments, the control server includes the sorting module 416 or portions of the DIOA module 415.

Figure 5:
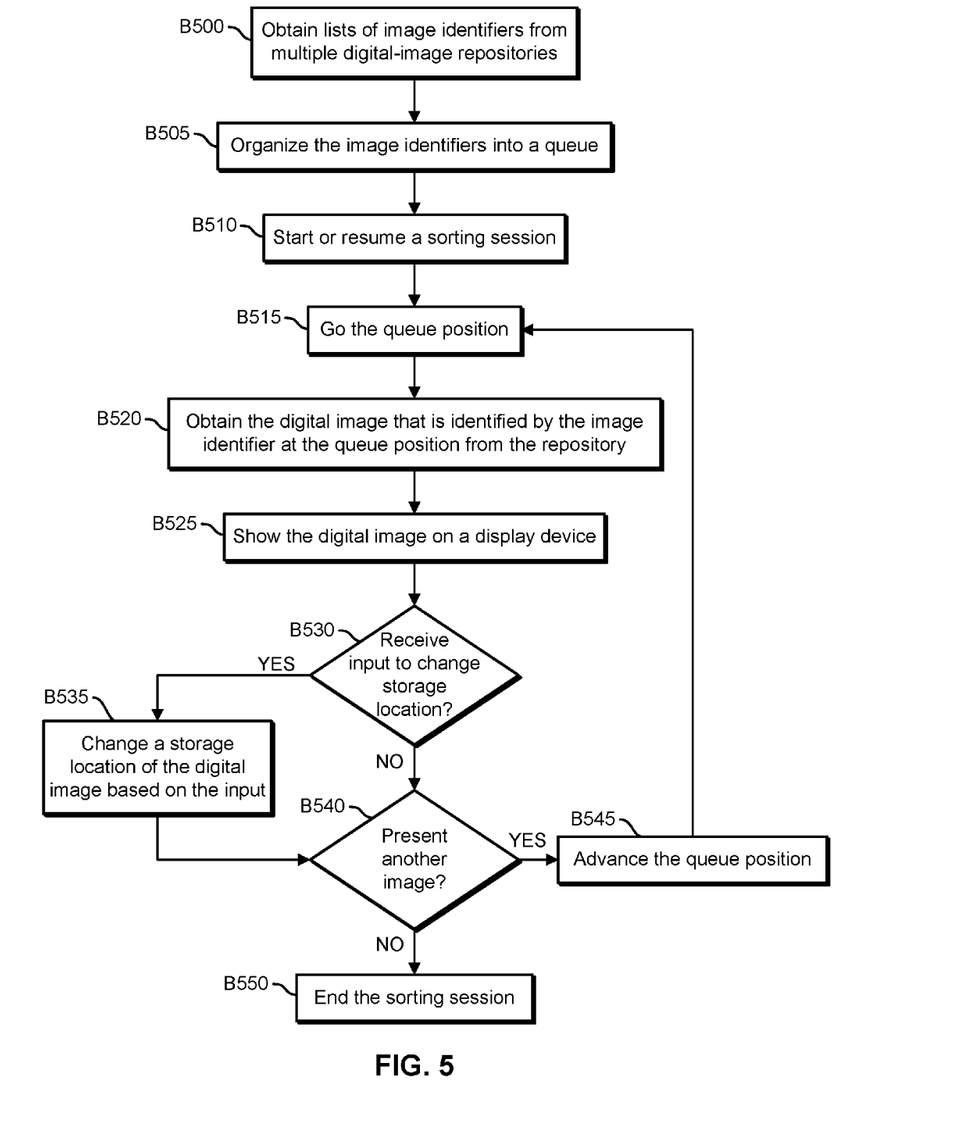
FIG. 5 illustrates an example embodiment of an operational flow for organizing digital images.

FIG. 5 illustrates an example embodiment of an operational flow for organizing digital images. The operations shown in FIG. 5 can be executed by one or more user devices, one or more control servers, and one or more digital-image repositories. The operations that are performed by a device may vary between different embodiments. The flow starts in B500, where lists of image identifiers (e.g., digital-image filenames) are obtained from multiple digital-image repositories. Next, in B505, the image identifiers are organized into a queue. The flow then moves to B510, where a new sorting session is started or a previously-started sorting session is resumed. Then, in B515, the user device or the control servers goes to the queue position.

The flow then moves to B520, where the digital image that is identified by the image identifier that is at the queue position is obtained. The flow proceeds to B525, where the digital image is sent to a display device, which shows the digital image. Next, in B530, it is determined if an input to change the storage location of the digital image has been received. If it has (B530=yes), then the flow moves to B535. Otherwise, (B530=no) the flow moves to B540. In B535, the storage location of the digital image is changed (e.g., the digital image is moved to a "discarded folder") based on the input. The flow then moves to B540.

In B540, it is determined if another image will be presented (e.g., the queue includes another image and the session has not been ended). If yes (B540=yes), then the flow moves to B545. In B545, the queue position is advanced to the next position, and then the flow returns to B515. If not (B540=no), then the flow proceeds to B550, where the sorting session is ended.

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Any applicable computer-readable medium (e.g., a magnetic disk (including a floppy disk, a hard disk), an optical disc (including a CD, a DVD, a Blu-ray disc), a magneto-optical disk, a magnetic tape, and semiconductor memory (including flash memory, DRAM, SRAM, a solid state drive, EPROM, EEPROM)) can be employed as a computer-readable medium for the computer-executable instructions. The computer-executable instructions may be stored on a computer-readable storage medium that is provided on a function-extension board that is inserted into a device or on a function-extension unit that is connected to the device, and a CPU provided on the function-extension board or unit may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A method comprising:
obtaining lists of image identifiers from multiple image repositories;
organizing the image identifiers in the lists of image identifiers into an image queue, thereby generating an image queue that includes image identifiers from multiple image repositories;
obtaining a first image that is identified by a first image identifier in the image queue, wherein the first image is obtained from a first image repository of the multiple image repositories;
adding the first image to a display;
obtaining a first input from a user interface;
removing the first image from the display;
changing a storage location of the first image based on the first input;
obtaining a second image that is identified by a second image identifier in the image queue, wherein the second image is obtained from a second image repository of the multiple image repositories; and
adding the second image to the display.

2. The method of claim 1, further comprising:
obtaining a selection of a sorting method to use when organizing the image identifiers into the image queue,
wherein the image identifiers are organized into the image queue according to the sorting method.

3. The method of claim 2, wherein the sorting method is random sorting, smart-random sorting, or priority sorting.

4. The method of claim 1, wherein the first input is a left swipe or a right swipe on a touchscreen.

5. The method of claim 1, wherein in the image queue, image identifiers from the multiple image repositories are intermingled.

6. A device comprising:
one or more computer-readable media; and
one or more processors that are coupled to the one or more computer-readable media and that are configured to cause the device to
obtain respective lists of image identifiers from multiple image repositories;
organize the image identifiers in the lists of image identifiers into an image queue, thereby generating an image queue that includes image identifiers from multiple image repositories, wherein the image queue defines a sequential order of the image identifiers, and wherein the sequential order of the image identifiers intermingles respective image identifiers from the multiple image repositories; and
in the sequential order defined by the image queue,
obtain a next image identifier from the image queue,
retrieve a next image that is identified by the next image identifier from a respective image repository,
add the next image to a display,
receive a user input from a user interface,
remove the next image from the display in response to receiving the user input, and
set an image identifier subsequent to the next image identifier in the sequential order as the next image.

7. The device of claim 6, wherein the one or more processors are further configured to cause the device to modify a storage location of the next image based on the user input.

8. The device of claim 7, wherein the one or more processors are further configured to cause the device to move the next image to a delete folder in response to receiving a user input that is a delete request.

9. The device of claim 8, wherein the user input that is a delete request is a left swipe on a touchscreen.

10. The device of claim 6, wherein the one or more processors are configured to cause the device to obtain a selection of a sorting method to use when organizing the image identifiers in the lists of image identifiers into the image queue,
wherein the one or more processors are configured to organize the image identifiers in the lists of image identifiers into the image queue according to the sorting method.

* * * * *